Oct. 6, 1964    E. T. OLSON    3,151,642
ANGULARLY SHIFTABLE SAW MOUNT
Filed Sept. 11, 1961    2 Sheets-Sheet 1

INVENTOR.
EUGENE T. OLSON
BY
ATTORNEY

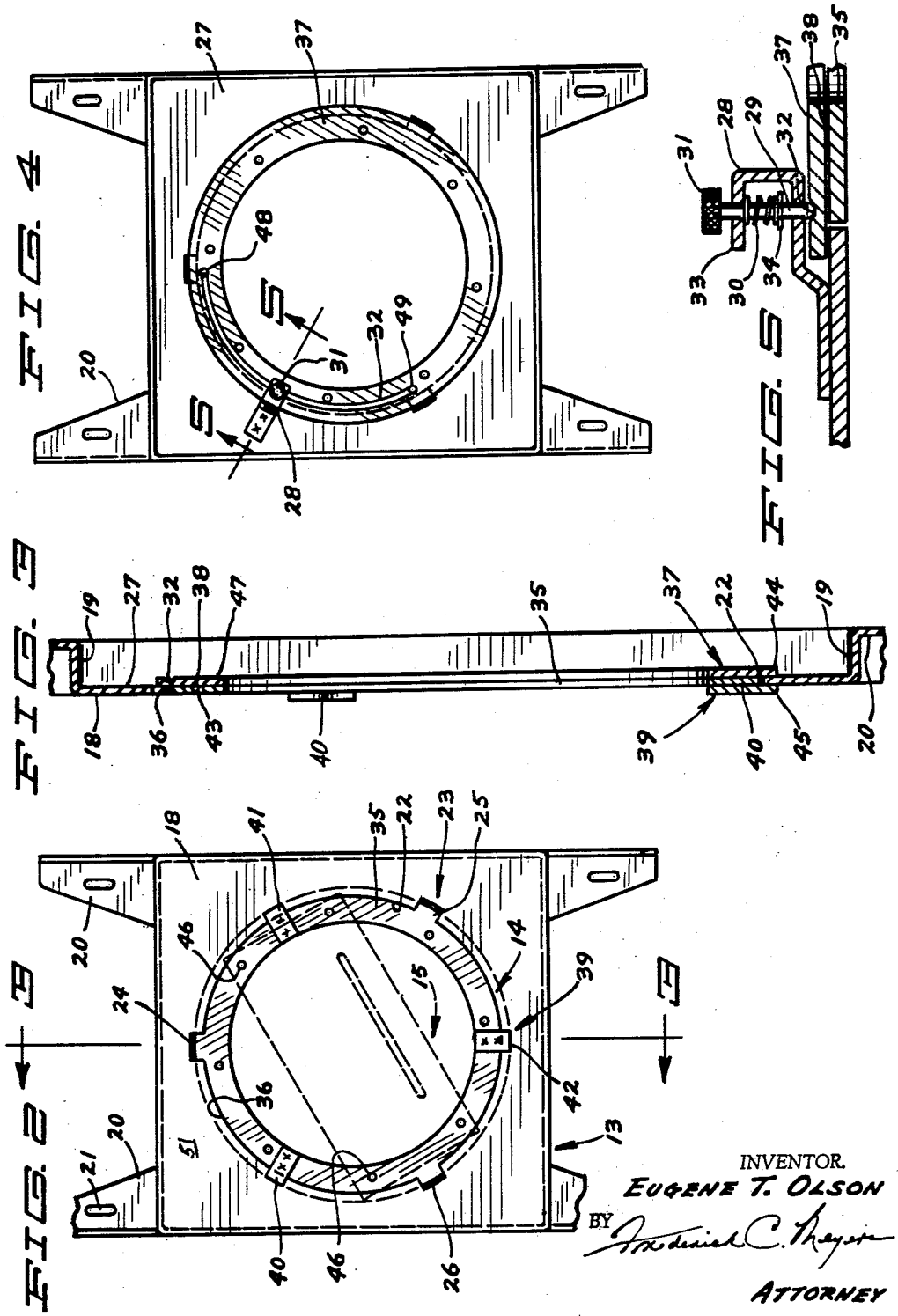

United States Patent Office 3,151,642
Patented Oct. 6, 1964

3,151,642
ANGULARLY SHIFTABLE SAW MOUNT
Eugene T. Olson, 2905 Lincoln NE.,
Minneapolis, Minn.
Filed Sept. 11, 1961, Ser. No. 137,410
1 Claim. (Cl. 143—47)

This invention relates to apparatus for sawing of panel boards such as plywood, and more particularly to a shiftable saw mount therefor.

Apparatus used for the sawing of panel boards is generally known to the art. Generally this type of apparatus has elements for holding the board to be cut in a substantially vertical position after which a saw, usually of the power-driven type, is pulled downwardly over the board to thereby perform the cutting operation. Through the use of rigid tracks and guides, the saw can be confined to a precisely vertical path.

Such saw apparatus also has been provided with means for rotating the saw element 90 degrees whereby a horizontal cut may be made on a board as the board is moved through the sawing apparatus framework.

Existing mounting facilities for the saws necessitate the relatively permanent fixing of the saw to the main framework by bolts or screws. Consequently, this mounting precludes a quick change and alternate use of different types and makes of saws on the same framework. Therefore, it is a general object of this invention to provide a shiftable saw mount which will readily lend itself to mounting of most conventional power-driven hand saws while at the same time allowing ready removal of the saw mount and saw if it is desired to use the saw on other board cutting apparatus.

More specifically, it is an object of this invention to provide a light-weight shiftable saw mount which is precisely adjustable with a minimum of wear and thus highly reliable.

Another object of this invention is to provide a shiftable saw mount which is easily removable from its base plate but which will not accidentally come loose therefrom.

A further object is to provide a shiftable saw mount which is not easily clogged or fouled and which is inexpensive and simple in design.

A still further object of this invention is to provide a saw mount which will be quickly adaptable to a number of conventional power-driven hand saws for use in ripping and cross-cutting panel material.

These and other objects and advantages of this invention will more fully appear from the following description, made in connection with the accompanying drawings, wherein like reference characters refer to the same or similar parts throughout the several views and in which:

FIGURE 2 is an enlarged rear view of the shiftable saw mount with the saw shown in phantom drawing;

FIGURE 3 is a cross-sectional side view of FIGURE 2 taken on line 3—3;

FIGURE 4 is a front view of the shiftable saw mount;

FIGURE 5 is a partial cross-sectional view of FIGURE 4 taken on line 5—5 and showing in enlarged detail the locking mechanism;

Figure 1:
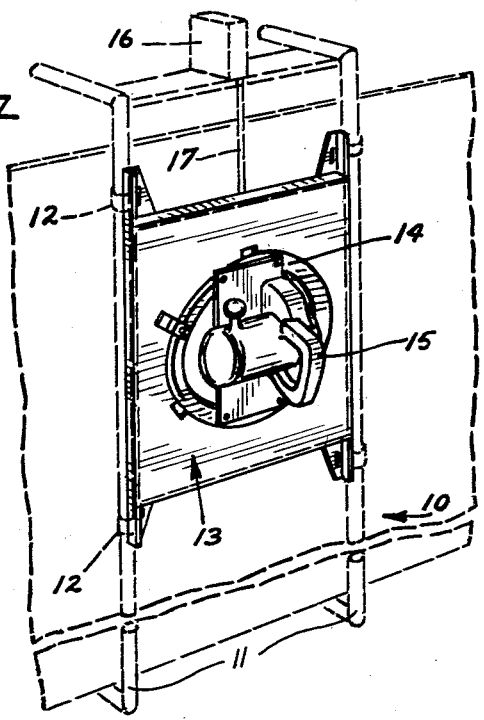
FIGURE 1 is a perspective view of the shiftable saw mount as it would appear when mounted on a panel board cutting apparatus which is shown in phantom drawing. The shiftable saw mount also has a saw mounted thereto.

Referring now more particularly to FIGURE 1, the wide board sawing apparatus 10 is shown in phantom drawing as having a pair of standards 11 which act as tracks for guides 12. Mounted across the guides and secured thereto is the shiftable saw mount 13. The medial portion of the saw mount 13 has a turntable assembly 14 to which is secured a conventional power-driven hand saw 15 which has the usual circular cutting blade and slotted guide plate (see FIGURE 2). To aid in the ease of vertical movement, a counterbalance 16 is employed which has a biased element 17 secured to the saw mount.

Referring more particularly now to FIGURE 2 wherein the saw mount is shown in rear view for greater operational clarity, the various elements and functions will be described.

The saw mount 13 principally consists of the base plate 18 and the turntable assembly 14. The base plate consists of a rigid sheet of material having structural flanges 19 (see FIGURE 3) formed around the periphery thereof. Positioned in each of the four corners is a mounting ear 20 having a mounting hole 21 for securing to the guides 12. The medial portion of the base plate 18 has a circular base opening defined by circumferential edge 22 and a plurality of notches 23 spaced therearound. For reasons to be set forth subsequently there are three notches 24, 25 and 26, respectively, which are equally displaced from each other by 120 degrees.

Referring to FIGURES 4 and 5, the front face surface 27 has secured thereto, by welding or other means, a locking assemblage which consists of a pin bracket 28 which, in turn, retains a lock pin 29 and a compression spring 30. The lock pin is provided with a head portion 31 that is knurled for easy grasping. In operation, the lock pin 29 is constantly urged downwardly into a groove 32 by the tension spring 30 which may be confined between bracket upper arm 33 and spring abutment 34.

The turntable assembly 14, referred to above, consists principally of a turntable annular ring 35 which has an outer edge 36 confronting, in sliding contact, edge 22. To maintain ring 35 coplanar with base plate 18, a retainer ring 37 is secured to ring 35 along joint 38 by welding, riveting or other means. Also provided to maintain the turntable ring 35 coplanar with the base plate 18 are retainer means 39, such as lugs 40, 41 and 42, which are spaced 120 degrees from each other so as to thereby interfit with notches 23. Lugs 39 are secured to the rear surface 43 of ring 35 also by welding or the like. The retainer ring 37 and retainer lugs 39 have portions thereof, 44 and 45 respectively, which extend beyond the base opening edge 22 (see FIGURE 3 particularly) and thereby provide the necessary locking means to retain edges 22 and 36 in a confronting relation.

The turntable ring 35 is provided with a plurality of saw mounting holes 46 to which may be mounted any of the conventional power-driven hand saws.

Referring to FIGURES 3 and 4, the front surface 47 of retainer ring 37 has formed therein a locater groove 32 which terminates at its ends in a vertical locater hole 48 and a horizontal locater hole 49. As seen in FIGURE 5, the groove 32 extends for a slight distance into the retainer ring 37. The locater holes 48 and 49, however, extend completely through the retainer ring to the joint 38. The function of this locater groove will also be explained subsequently.

Figures 6, 7, 8:
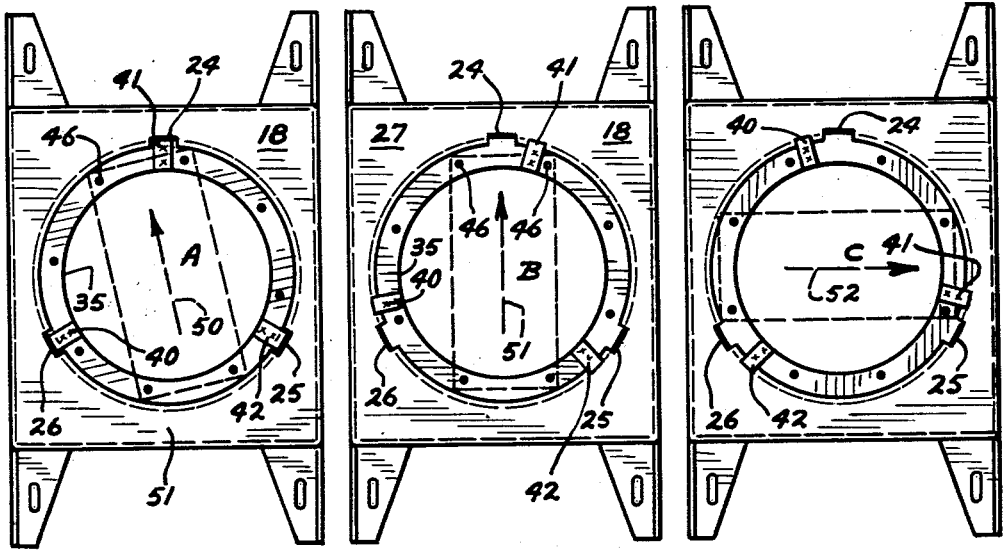
FIGURE 6 (sheet 1) is a reduced size rear view of the shiftable saw mount with the turntable ring oriented to the installation position.
FIGURE 7 is a view similar to that of FIGURE 6 but with the turntable ring rotated to the vertical sawing position.
FIGURE 8 is a view similar to FIGURE 7 wherein the turntable ring is further rotated to the horizontal sawing position.

Referring to FIGURES 6, 7 and 8, the versatile operation of the present invention will be described. In FIGURE 6, the retainer lugs 40, 41 and 42 are shown aligned with notches 24, 25 and 26. With the lugs and notches so aligned, the turntable ring 35 may be either removed from, or installed in, base plate 18. In this position, referred to as position "A," the saw mounting holes 46 would align the saw blade of a saw mounted thereto in the orientation of arrow 50. With the turntable ring 35 positioned into coplanar relation with base plate 18, the ring 35 may then be rotated to position "B" shown in FIGURE 7, which represents the vertical sawing position. By so rotating the ring, the retainer lugs 40, 41 and 42 have been rotated whereby to ride upon the rear surface 51 of base plate 18. With the retainer ring 37 acting in co-operation with retainer lugs 39, ring 35 will be held in coplanar relation to base plate 18 at all angular positions of rotation thereof excepting that represented as position "A" in FIGURE 6. The notches 24, 25 and 26 thus do not enter into further operation of the shiftable saw mount until the ring 35 is once again removed. The mounting holes 46 are oriented in a position "B" of FIGURE 7 which is represented by arrow 51. Thus with a power-driven hand saw secured to the ring 35, a vertical cut on a panel board may be made by moving the entire shiftable saw mount vertically as explained with reference to FIGURE 1 above. To retain the ring 35 in this position, the lock pin 29 will seat in vertical locater hole 48.

Assuming next that the operator will desire to make a horizontal cut on a wide board, it is only necessary to rotate the saw blade 90 degrees. With the present invention, all that is required for such operation is the retraction of lock pin 29 from vertical locater hole 48 and the subsequent 90 degree rotation of the turntable 35 to the position "C" represented by arrow 52. In this position, lock pin 29 under its spring load will seat itself into horizontal locater hole 49.

If, after using the saw on the panel board cutting apparatus, the operator wishes to use the same saw on another cutting apparatus, all he need do is manually retract the pin 29 from the horizontal locater hole, rotate the ring and saw back to position "A" and then remove the entire assembly.

It is pointed out that through the use of guide ring 37, the saw dust and other foreign matter is kept clear of mating surface edges 22 and 36 thereby allowing greater clog-free operation and hence greater life and reliability.

It will, of course, be understood that various changes may be made in the form, details, arrangements and proportions of the parts without departing from the scope of this invention as set forth in the appended claim.

What is claimed is:

A shiftable saw mount adapted for use with a panel board saw apparatus and power-driven hand saw of the type having a slotted guide plate and a circular blade extending through the slot, said shiftable saw mount comprising, a base plate having a circular base opening therethrough, an annular turntable ring rotatably positioned within said base opening and having its peripheral edge in arcuate sliding contact with the circumferential edge of said base opening, mounting means on said annular ring adapted to secure the guide plate of said hand saw in diametric relation thereacross, means secured to said ring for retaining said ring within said circular base opening during arcuate rotation within a predetermined working range and releasing said ring when rotated to an angular position beyond said working range, and means for normally restricting the rotation of said annular ring to said predetermined working range but actuatable to permit rotation of said ring to said angular position beyond said working range.

References Cited in the file of this patent
UNITED STATES PATENTS

| | | |
|---|---|---|
| 988,038 | Shipley | Mar. 28, 1911 |
| 1,697,873 | Lambert | Jan. 8, 1929 |
| 1,899,883 | Sacrey | Feb. 28, 1933 |
| 2,784,750 | Thomas | Mar. 12, 1957 |
| 2,810,412 | Roug | Oct. 22, 1957 |
| 2,818,892 | Price | Jan. 7, 1958 |
| 2,973,020 | Bennett | Feb. 28, 1961 |